(12) United States Patent
Sargent

(10) Patent No.: US 7,661,240 B2
(45) Date of Patent: Feb. 16, 2010

(54) ROOFTOP STRUCTURE SUPPORTING STAND

(75) Inventor: Nathan M. Sargent, Heber, UT (US)

(73) Assignee: Miro Industries, Inc., Salt Lake City, UT (US)

( * ) Notice: Subject to any disclaimer, the term of this patent is extended or adjusted under 35 U.S.C. 154(b) by 562 days.

(21) Appl. No.: 10/947,687

(22) Filed: Sep. 23, 2004

(65) Prior Publication Data

US 2006/0059789 A1 Mar. 23, 2006

(51) Int. Cl.
*E04C 5/16* (2006.01)
(52) U.S. Cl. .......................... 52/677; 52/126.7; 52/684; 248/146; 248/156; 248/530
(58) Field of Classification Search .................. 52/26, 52/607, DIG. 11, 263, 126.1, 126.5, 126.7, 52/677, 678, 684, 685, 686; 248/237, 55, 248/68.1, 72, 73, 146, 156, 530; D8/380, D8/349, 354
See application file for complete search history.

(56) References Cited

U.S. PATENT DOCUMENTS

| | | | | |
|---|---|---|---|---|
| 3,505,920 | A * | 4/1970 | Thurner | 411/441 |
| 3,633,862 | A * | 1/1972 | Breen | 248/251 |
| 3,769,190 | A | 10/1973 | Deem, Jr. | |
| 4,052,826 | A * | 10/1977 | Chisholm | 52/98 |
| 4,241,810 | A * | 12/1980 | Newlon | 188/376 |
| 4,249,657 | A * | 2/1981 | Bates | 206/335 |
| 4,442,991 | A * | 4/1984 | Levens | 248/146 |
| 4,502,653 | A * | 3/1985 | Curtis, Jr. | 248/55 |
| 5,172,457 | A * | 12/1992 | Allen et al. | 27/1 |
| 5,217,191 | A | 6/1993 | Smith | |
| 5,685,508 | A | 11/1997 | Smith | |
| 5,816,554 | A | 10/1998 | McCracken | |
| 5,855,342 | A | 1/1999 | Hawkins et al. | |
| 5,906,341 | A * | 5/1999 | Brown | 248/49 |
| D420,277 | S * | 2/2000 | Burke et al. | D8/380 |
| 6,044,592 | A * | 4/2000 | Strieter | 52/27 |
| D427,049 | S | 6/2000 | Neider et al. | |
| 6,195,949 | B1 * | 3/2001 | Schuyler | 52/223.13 |
| 6,345,474 | B1 * | 2/2002 | Triplett | 52/169.9 |
| 6,364,256 | B1 | 4/2002 | Neider et al. | |
| 6,502,791 | B2 * | 1/2003 | Parker | 248/70 |
| 6,592,093 | B2 * | 7/2003 | Valentz | 248/346.01 |
| 6,655,648 | B2 * | 12/2003 | Harris | 248/678 |
| 6,679,461 | B1 * | 1/2004 | Hawkins | 248/74.2 |
| 6,863,253 | B2 * | 3/2005 | Valentz et al. | 248/519 |
| D521,851 | S * | 5/2006 | Smart | D8/354 |
| 7,441,731 | B2 * | 10/2008 | Smart et al. | 248/74.1 |

* cited by examiner

*Primary Examiner*—Richard E Chilcot, Jr.
*Assistant Examiner*—Chi Q Nguyen
(74) *Attorney, Agent, or Firm*—Thorpe North & Western LLP

(57) ABSTRACT

A roof top structure support has a flat bottom rigid base to be positioned on a roof and spread the load supported by the support substantially evenly over the surface of the base in contact with the roof. A tower rises from the base and includes a slot across the top thereof and a bore therein extending downwardly from the bottom of the slot and adapted to receive a threaded rod therein. The slot in the top of the tower is sized to receive a strut therein. A bolt extending through the strut and into the bore secures the strut to the support. Struts and other structures can be supported above the tower and slot by threaded rod such as "all thread" screwed into and extending from the bore.

18 Claims, 4 Drawing Sheets

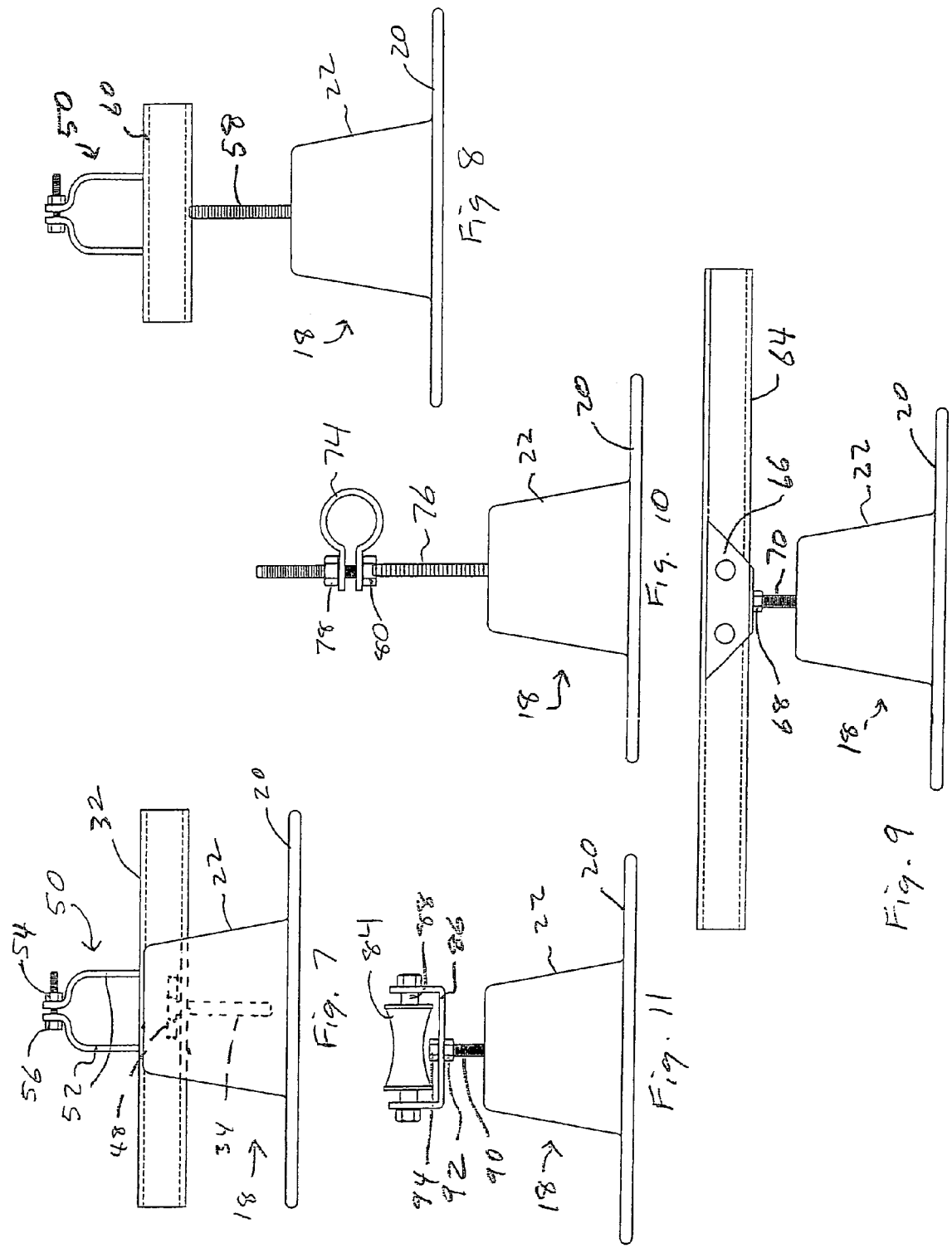

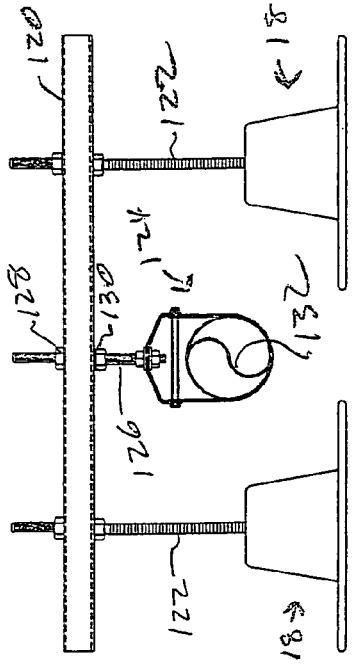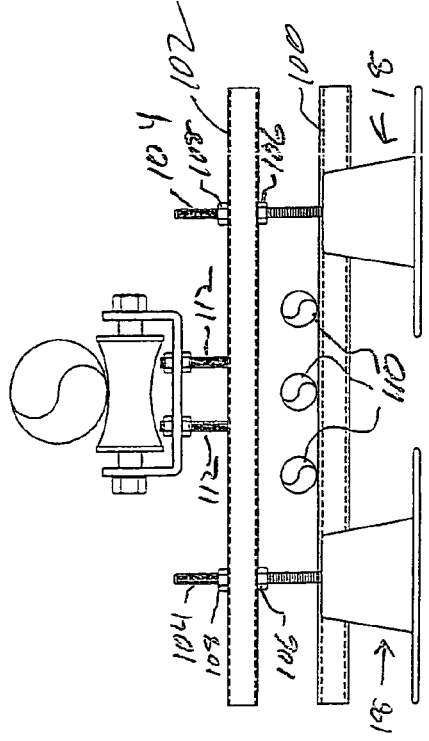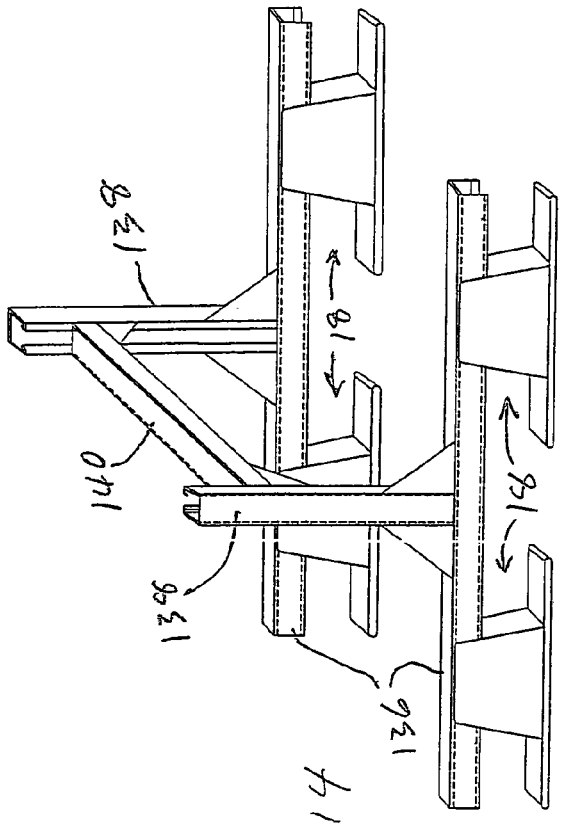

ROOFTOP STRUCTURE SUPPORTING STAND

BACKGROUND OF THE INVENTION

1. Field

Figure 1:
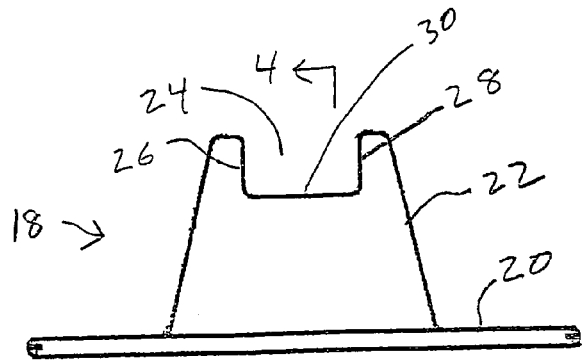

The invention is in the field of supports for exterior structures on building roofs.

2. State of the Art

It is very common in commercial buildings for there to be various types of pipes which are exposed and run along the top of the roofs of such buildings. These pipes may be connected to air conditioning units mounted on a building roof or to various other service units.

Historically, it was common practice for these pipes to be supported above the roof surface at intervals along their length by placing blocks of wood between the roof surface and the pipes. With temperature changes, the pipes expand and contract and, partly because of the large contact surface area between a block and the pipe, the block moves with the pipe. After a period of time, the movement of the block against the roof with the weight of the pipe thereon causes damage to the roof, which usually results in a leak and requires expensive roof repair. Even where the blocks are nailed down to the roof the nails and the wood usually deteriorate in a relatively short time period so that the blocks break loose. Further, wood blocks are difficult to seal so the roof usually leaks about these nail holes.

Various pipe holders that sit on a roof to support the pipes have now been developed and are in common use. For example, U.S. Pat. Nos. 4,502,653 and 4,513,934 show pipe-supporting devices which have substantially flat bottomed bases with pipe supporting structure rising from the base that substantially equally distributes the weight of the pipe over the bottom of the base and thus over the area of the roof in contact with the base. The pipe supporting structures have a substantially U shaped structure having divergent line contacts for receiving and supporting the pipe above the base. In this manner, the pipe is supported in the U with two contact points. This provides for easy sliding movement of the pipe within the support as the pipe expands or contracts. The support of the '653 patent includes a plastic roller in the bottom of the U recess.

A support system for use in supporting pipe, conduit, and various other items and structures has been in use for long periods of time and utilizes struts with various types of clamps made to mate with the struts. Such strut systems are made and sold by various manufacturers such as Unistrut Corporation of Wayne, Mich. It has not been until recently that such strut systems have been used to support pipes, conduit, and other items and structures above building roofs.

U.S. Pat. No. 6,364,256 shows roof top pipe supports similar to those shown in U.S. Pat. Nos. 4,502,653 and 4,513,934, which have substantially flat bottomed bases with pipe supporting structure rising from the base that substantially equally distributes the weight of the pipe over the bottom of the base and thus over the area of the roof in contact with the base. Those bases, in one embodiment, include two raised portions with studs extending therefrom to which a pipe supporting roller or a length of strut can be height adjustably secured between the studs. The standard strut clamps can then be used to hold electrical conduit or pipe.

U.S. Pat. No. 5,217,191 shows heavy bases, generally reinforced concrete, which sit on a foot pad glued to a roof surface and, in one embodiment, support a strut directly on the flat top surface of the base. These heavy reinforced concrete bases are difficult to ship and transport.

U.S. Pat. No. 5,855,342 shows a plastic foam roof mount base which includes a strut embedded in the foam. The standard strut clamps can then be used to hold electrical conduit or pipe to the strut which is held above the roof surface by the plastic foam material. However, it has been found that the foam base material does not hold up well under the sun and weather exposure on a roof. Furthermore, the foam can retain water and small microbes which attract birds that peck the foam thereby causing damage to the foam.

Room remains for a support which can easily accept and support struts above a roof surface and on which a structure to be supported can be easily assembled on site on a roof.

SUMMARY OF THE INVENTION

According to the invention, a rooftop structure support specifically configured to support a strut above a roof surface so the strut can then support a pipe, conduit, or any other item or structure to be supported above a roof surface, such as a walkway, air conditioner, etc., includes a flat bottom rigid base to be positioned on a roof, similar to the bases of U.S. Pat. Nos. 6,364,256, 4,502,653, and 4,513,934. A tower rises from the base with a bore in the tower adapted to receive a threaded rod or stud. A slot in and extending across the top of the tower is sized to receive a strut therein, and the strut can be secured to the support by a bolt extending through the strut into the tower bore. A short length of strut, such as to support an electrical conduit or a pipe secured thereto, is supported above the roof surface by a single support of the invention. A longer strut, such as to support several conduits, pipes, or other items or structures, may be supported by two supports of the invention with such supports securing opposite ends of the longer strut above the roof so that the strut extends between the supports. The item or items to be supported above the roof surface are then secured to the strut by the standard strut clamps or by structures formed by additional struts or threaded rods secured to the struts. Rather than the struts being received in the strut receiving slots in the tops of the towers, threaded rods or studs secured in and extending from the tower bores can support a strut at adjustable heights above the slot and tower. Brackets, such as pipe supports or pipe hangers of various types, rather than struts, may be supported by the threaded rods or studs secured in and extending from the tower bores.

The rooftop structure support of the invention with a single tower which distributes the weight thereon over the base in contact with the roof surface easily allows any length item, such as a strut or other beam, to be supported by two such supports. Several of these supported struts or beams can then be used together to support additional structure. With the wide variety of items which can be supported by struts or threaded rod by the support of the invention, and the option to use multiple such supports, the support provides a flexibility and versatility previously unavailable to builders for supporting items and structures on a roof top.

THE DRAWINGS

Figure 2:
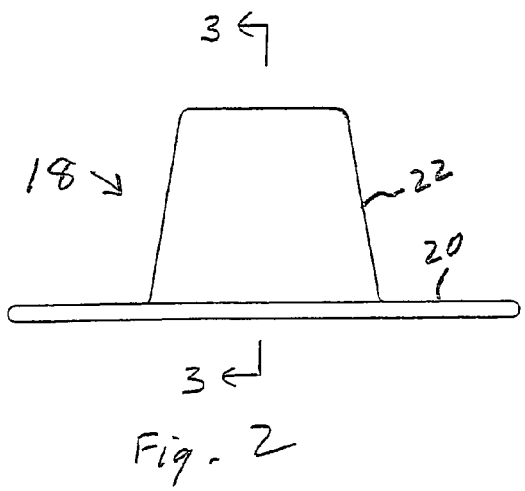
Figure 3:
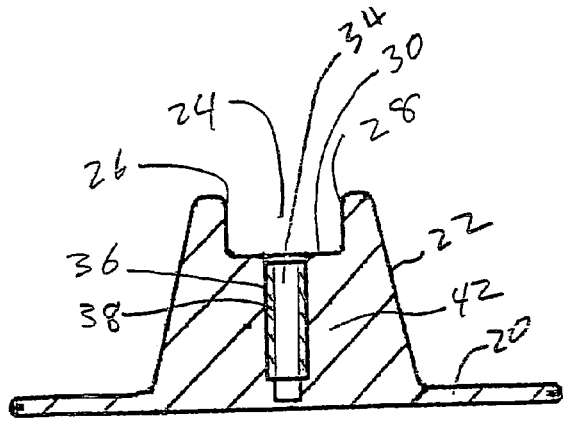
Figure 4:
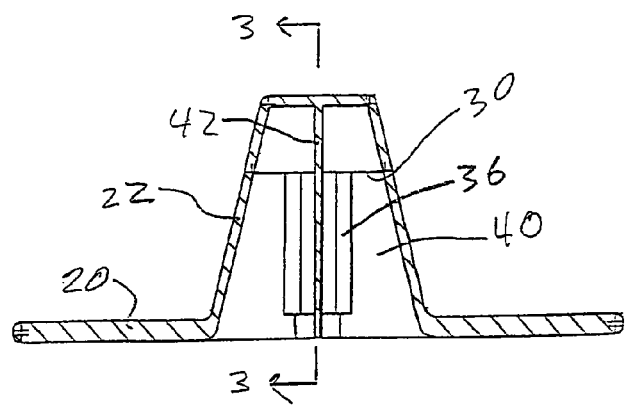
Figure 5:
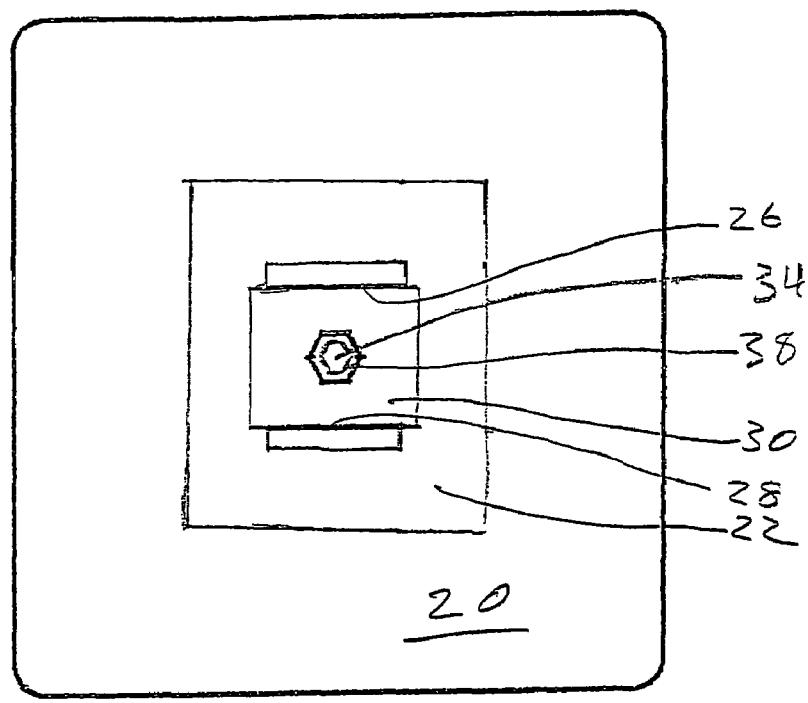
Figure 6:
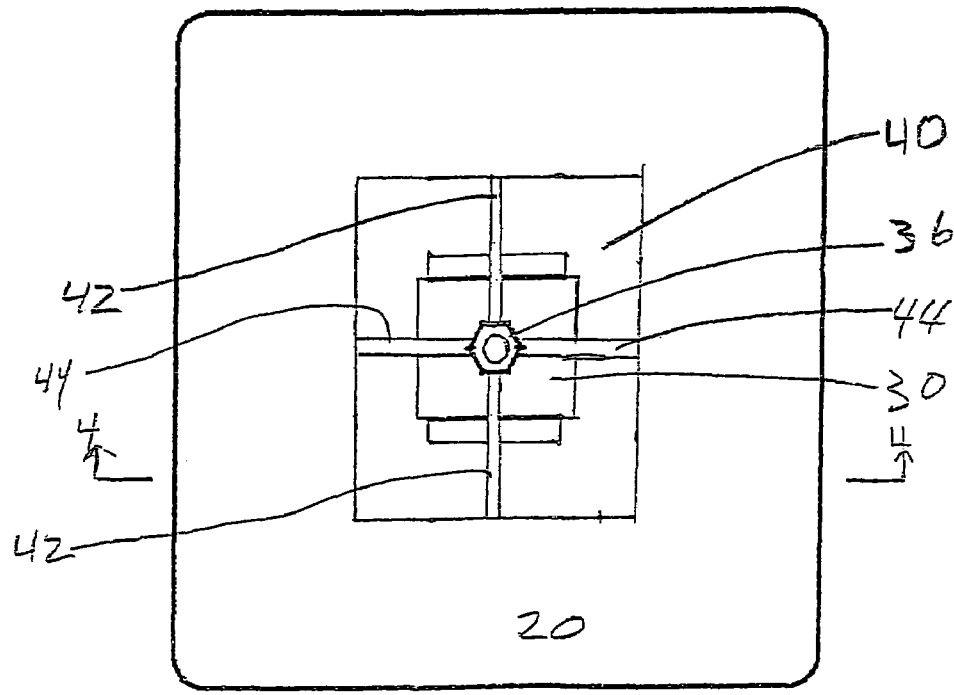

In the accompanying drawings, which show the best mode currently contemplated for carrying out the invention:

FIG. 1 is a front elevation of a support of the invention;

FIG. 2, a side elevation of the support of FIG. 1;

FIG. 3, a vertical section through the center of the support taken on the line 3-3 of FIGS. 2 and 4;

FIG. 4, a vertical section through the support taken on the line 4-4 of FIG. 1 or 6;

FIG. 5, a top plan view of the support of FIG. 2;

FIG. 6, a bottom plan view of the support of FIG. 2;

FIG. 7, a side elevation of the support similar to that of FIG. 2, showing a strut mounted in the support;

FIG. 8, a side elevation of the support similar to that of FIG. 5, but showing the strut held elevated above the base;

FIG. 9, a side elevation of the support similar to that of FIG. 5, but showing a different strut support;

FIG. 10, a side elevation of the support similar to that of FIG. 5, but showing a different pipe support;

FIG. 11, a side elevation of the support similar to that of FIG. 5, but showing a pipe support rather than a strut or clamp;

FIG. 12, a side elevation showing two supports of the invention supporting a strut structure;

FIG. 13, a side elevation showing two supports of the invention supporting a strut which supports a pipe hanger; and FIG. 14, a perspective view of four supports of the invention supporting a duct or cable tray structure.

DETAILED DESCRIPTION OF THE ILLUSTRATED EMBODIMENTS

The support of the illustrated embodiment of the invention, indicated generally by reference number 18, includes a substantially flat base 20 with a tower 22 rising from the base and centered on the base. Tower 22 has a slot 24 formed by slot sides 26 and 28, and slot bottom 30, FIGS. 1 and 3, extending across the top thereof which is sized to receive a standard strut 32, FIG. 7, such as manufactured and sold by Unistrut Corporation of Wayne, Mich. Several other manufacturers also make struts of the same standard size. A bore 34, FIGS. 3 and 5, formed by wall 36, FIGS. 3, 4, and 6, extends downwardly from the tower 22 at the bottom of slot 24 and includes a threaded sleeve 38, FIGS. 3 and 5, therein that forms threads inside the bore so that a threaded rod or stud, such as the threaded end of a bolt, can be easily threaded into the tower bore. It is preferred that the base and tower be integrally molded from a plastic material, such as a UV resistant polycarbonate plastic which resists deterioration from sun exposure. While the sleeve 38 can be molded into the bore when molding the support, it is preferred that the bore be molded so that wall 36 forms a hexagonal bore sized to accept a hexagonal threaded sleeve frictionally inserted therein after molding of the base, the hexagonal shape securely holding the sleeve from rotating.

The tower 22 is hollow meaning that an open space 40, FIGS. 4 and 6, is created in the center of the base where the tower extends upwardly. Wall 36 forming the tower bore extends downwardly from slot bottom 30 into space 40. Reinforcing walls 42 and 44 extend from bore wall 36 to tower 22 to reinforce and stabilize the tower bore in the tower. When integrally molded, the support is very strong and will support substantial weight. The base is placed on a roof surface and can slide on the surface without damaging the roof. While the bases of U.S. Pat. Nos. 6,364,256, 4,502,653, and 4,513,934 have turned up sides around their perimeter to protect the roof surface when and if the support slides on the roof and the present support could also have such turned up sides, it has been found that rounded edges on a base of about one-quarter inch thickness will similarly allow the base to slide on the roof without damaging the roof surface. Weight supported by the tower is transferred to the base which substantially spreads the weight over the entire base surface area in contact with the roof surface. With a base about eight inches square with a tower space about three inches by four inches at the base, the base will spread a one hundred pound load so that the load applied to the roof is about two pounds per square inch. This spreading of the weight protects the roof against damage from the support.

The support of the invention is designed for use in assembling a wide variety of roof top structures on site on the roof of a building by a contractor or other person rather than ordering and using preconfigured supports. The support is particularly designed to accept struts for use as part of the structure to be supported on the roof and the slot 24 is sized to accept standard struts therein, but use of struts, and positioning struts in the slot, is not necessary. Further, the support is also particularly designed to accept threaded rod known as "all thread" and the threaded tower bore 34 is sized and threaded to accept standard "all thread" as well as bolts or other threaded shafts or studs.

A basic use of the support 18 of the invention is shown in FIG. 7, wherein a strut 32 is received in slot 24 at the top of the tower 22. Slot 24 and strut 32 extend transversely to the extent of tower 22 and substantially parallel to the base 20 of the support. Strut 32 extends over tower bore 34 located in the bottom of the slot 24 so a bolt 48 tightened into bore 34 is preferably used to secure strut 32 in slot 24. With strut 32 in slot 24, any of the wide variety of clamps available for use with struts can be used to secure an item desired to be supported above a roof to the strut, which, in turn, secures it to the support. Thus, as shown in FIG. 7, a conduit clamp 50 is secured in normal manner to strut 32. Conduit clamp 50 includes clamp hoops 52 which are tightened around a length of conduit to be supported and the hoops are tightened about the conduit by nut 54 on screw 56. Conduit is usually secured to the roof top support and is not slidable therein as pipe usually is. Further, condensate lines from air conditioning unit are also usually secured to the supports.

FIG. 8 shows a length of "all thread" threaded rod 58 threaded into tower bore 34 so as to extend upwardly from the support 18. A length of strut 60 with conduit clamp 50 is secured to the end of rod 58. Since "all thread" rod can be easily cut on site to a desired length, the height of strut 60 can be easily set at any desired height above support tower 22. FIG. 9 shows a length of strut 64 with bracket 66 adjustably supported above support tower 22 by nut 68 on threaded rod 70. A nut, not shown, inside strut 64 is tightened against nut 68 to securely position bracket 66 and strut 64 on rod 70.

FIG. 10 shows a conduit clamp 74 secured to an "all thread" rod 76 extending from the tower bore by nuts 78 and 80. Nut 80 adjusts the height of clamp 74 above tower 22 while nut 78 tightens the clamp 74 around the conduit or other tubing. FIG. 11 shows a pipe support roller 84 rotatably mounted by shaft 86 in bracket 88 in normal manner with bracket 86 secured above tower 22 by "all thread" 90 and nuts 92 and 94. Roller 84 allows a pipe supported thereon to expand and contract and move on roller 84 with respect to support 18 which generally remains stationary on a roof surface.

FIG. 12 shows two supports 18 of the invention positioned to each hold an opposite end of both struts 100 and 102. Strut 100 is secured to the supports in the tower slots and strut 102 is adjustaby supported by "all thread" rods 104. Nuts 106 and 108 secure strut 102 to "all thread" rods 104. Conduits 110 are shown schematically secured to strut 100, while the pipe support roller 84 of FIG. 11 is secured to strut 102 by lengths of "all thread" 112 extending from strut 102. FIG. 13 shows two supports 18 of the invention adjustably supporting strut 120 on "all threads" 122. A pipe hanger 124 is adjustably secured to strut 120 by "all thread" rod 126 and nuts 128 and 130, and supports pipe 132.

FIG. 14 shows a more elaborate structure fabricated from struts and supported by the supports of the invention. Thus, respective pairs of supports 18 support opposite ends of respective spaced struts 136 which in turn support struts 138, which then support strut 140. Strut 140 can then support pipes or other items above the roof with clamps or hangers, or items, such as a walkway, which rest on strut 140.

As can be seen, a wide variety of structures can be assembled and supported on a roof by the supports of the invention. The ability of the support to easily accept and support struts and threaded rods allows a contractor to use the supports as part of a variety of custom built structures on a roof. The single tower extending centrally from the base as shown for the illustrated embodiment has been found to provide desired flexibility for use in supporting a wide range of items and structures. It also facilitates the use of more than one support when needed.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

I claim:

1. A roof top structure support, comprising:
 a flat bottom rigid base to be positioned on a roof,
 a tower rising from the base;
 a slot in and extending across the top of the tower sized to receive a strut therein, said slot having a flat bottom substantially parallel to the flat bottom of the base;
 a threaded bore in the bottom of the slot in the tower adapted to receive a threaded rod therein;
 a strut positioned in the slot and extending transversely to the tower; and
 a threaded rod extending through the strut and into the bore to secure the strut to the support; wherein the threaded bore includes an internally threaded sleeve secured therein which provides internal threads in the bore to engage the threaded rod.

2. The roof top structure support according to claim 1, wherein the base has rounded perimeter edges to slide over a roof surface without damaging the surface.

3. The roof top structure support according to claim 1, wherein the tower is a single tower centrally located with respect to the base.

4. The roof top structure support according to claim 3, wherein the tower includes a perimeter where it joins the base, and wherein the base extends outwardly around the perimeter of the tower where it joins the base.

5. The roof top structure support according to claim 3, wherein the tower is hollow, wherein the threaded bore is formed by a bore wall extending from the slot bottom into the hollow of the tower, and wherein reinforcing walls extend from the tower through the hollow of the tower to the bore wall.

6. The roof top structure support according to claim 1, wherein the slot sized to receive a strut therein is sized and configured to receive and hold the strut in a transverse orientation to the tower.

7. The roof top structure support according to claim 1, wherein the slot is symmetrically positioned in relation to the tower.

8. The roof top structure support according to claim 1, wherein the support is integrally molded of a plastic material.

9. The roof top structure support according to claim 8, wherein the bore includes an internally threaded sleeve secured therein which provides internal threads in the bore to engage the threaded rod.

10. A roof top structure support, comprising:
 a flat bottom rigid base to be positioned on a roof, the base having an upper surface;
 a single tower rising from the upper surface of the base and positioned centrally on the base, said tower configured to substantially distribute a load on the tower substantially equally over the base and the roof in contact with the base;
 a slot in and extending across the top of the tower sized to receive a strut therein, said slot having a flat bottom higher in elevation with respect to the upper surface of the base and substantially parallel to the flat bottom of the base;
 an internally threaded bore extending downwardly in the tower from the bottom of the slot and adapted to receive a threaded rod therein; and
 a strut positioned in the slot and extending transversely to the tower; and
 a threaded rod extending through the strut and into the bore to secure the strut to the support; wherein the threaded bore includes an internally threaded sleeve secured therein which provides internal threads in the bore to engage the threaded rod.

11. The roof top structure support according to claim 10, wherein the base has rounded perimeter edges to slide over a roof surface without damaging the surface.

12. The roof top structure support according to claim 10, wherein the support is integrally molded of a plastic material.

13. The roof top structure support according to claim 12, wherein the plastic material is a UV resistant polycarbonate plastic.

14. The roof top structure support according to claim 10, wherein the tower includes a perimeter where it joins the base, and wherein the base extends outwardly around the perimeter of the tower where it joins the base.

15. The roof top structure support according to claim 10, wherein the tower is hollow, wherein the bore is formed by a bore wall extending from the slot bottom into the hollow of the tower, and wherein reinforcing walls extend from the tower through the hollow of the tower to the bore wall.

16. A method of supporting a structure on a rooftop, comprising:
 positioning a flat bottom rigid base on a roof, said flat bottom rigid base comprising a tower rising from the base and a slot in and extending across the top of the tower sized to receive a strut therein, said slot having a flat bottom substantially parallel to the flat bottom of the base, wherein said tower further comprises a threaded bore in the bottom of the slot in the tower adapted to receive a threaded rod therein;
 positioning a strut above the tower; and
 positioning a threaded rod through at least a portion of the strut and into the internally threaded bore; wherein the threaded bore includes an internally threaded sleeve secured therein which provides internal threads in the bore to engage the threaded rod.

17. A roof top support system which is unsecured to the roof top comprising:
 a roof top;
 a solid flat bottom rigid base which is positioned on the roof top and is unsecured to the roof top;
 a tower rising from of the base;

a slot in and extending across the top of the tower sized to receive a strut therein, said slot having a flat bottom substantially parallel to the flat bottom of the base;

a strut positioned in the slot and extending transversely to the tower; and a threaded rod extending through the strut and into the base to secure the strut to the support; wherein the threaded rod does not penetrate the bottom of the base; a threaded bore in the bottom of the slot; and wherein the threaded bore includes an internally threaded sleeve secured therein which provides internal threads in the bore to engage the threaded rod.

18. The roof top support system of claim 17, wherein the base extends outwardly from the tower.

* * * * *